Oct. 28, 1941. G. S. SMITH 2,260,589
MAGNETIC FLUX METER
Filed July 24, 1939 2 Sheets-Sheet 1
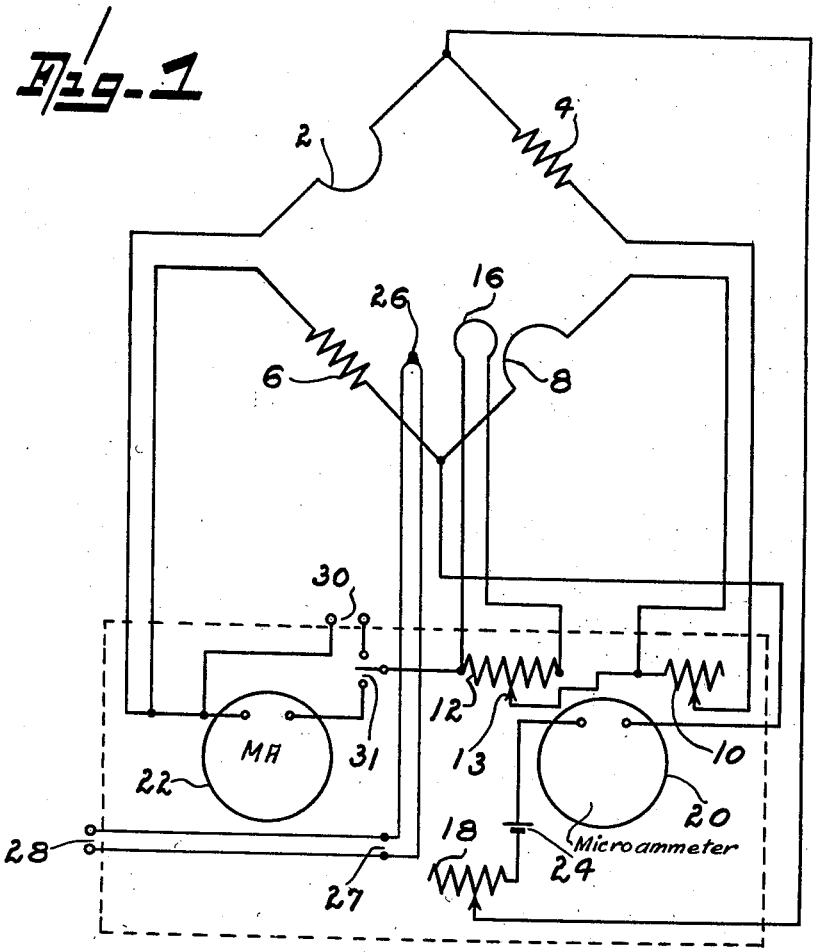
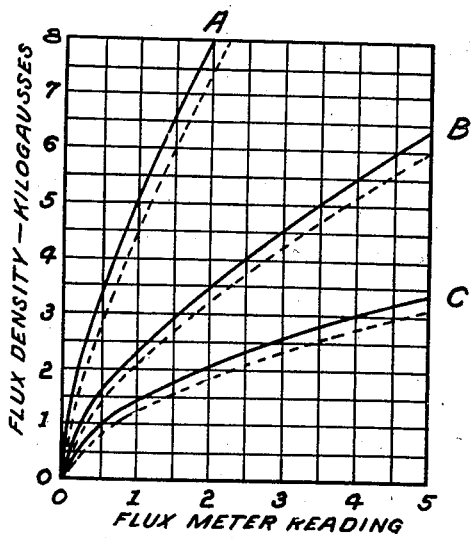
INVENTOR
George S. Smith
BY
Smith & Tuck
ATTORNEYS Oct. 28, 1941.  G. S. SMITH  2,260,589

MAGNETIC FLUX METER

Filed July 24, 1939  2 Sheets-Sheet 2

INVENTOR
George S. Smith
BY
ATTORNEYS

Patented Oct. 28, 1941

2,260,589

UNITED STATES PATENT OFFICE 2,260,589

MAGNETIC FLUX METER

George S. Smith, Seattle, Wash.

Application July 24, 1939, Serial No. 286,094

4 Claims. (Cl. 175—183)

My present invention relates broadly to electrical metering apparatus, and more particularly to a magnetic flux meter and a novel method of measuring magnetic flux intensity. In my present invention it is the combination of bismuth wire in a Wheatstone bridge with certain current measuring devices which constitutes as a whole the magnetic flux measuring instrument.

It has long been known that the electrical resistance of bismuth is affected by the presence of a magnetic field. In the prior art of measuring magnetic flux by means of bismuth, this procedure required the very careful measurement of the resistance offered by the bismuth wire in the field, as well as that in zero field. The percentage change in resistance thus obtained is referred for interpretation to a calibration curve. As is evident, this method is cumbersome for general use, and requires care and skill for accuracy. This is due primarily to a small change in temperature which may occur between measurements and will often result in a considerable error in the result. It is, therefore, evident that this method is not well adapted to continuous measurement.

Heretofore the usual procedure was to measure the resistance of the bismuth by means of a Wheatstone bridge. However, in such a setup the Wheatstone bridge is merely incidental to the measurement of the bismuth resistance. In my invention I do not measure the exact resistance of the bismuth wire nor the percentage change of resistance therein, but rather the unbalanced current in the bridge due to unbalanced resistances resulting from the presence of magnetic flux.

One of the main objects of this invention is to provide a meter for measuring magnetic flux intensities in alternating current, direct current or transient fields.

Another object of this invention is to provide a meter wherein the temperature resistance coefficients of the various elements are substantially canceled out.

A further object of this invention is to provide a meter in which the thermo-electric effect of dissimilar metals are essentially neutralized.

A still further object of the invention is to provide a means for determining the direction of the magnetic vector being measured.

Another feature of this invention is to provide means whereby corrections may be applied to the meter readings when the sensitivity of the bridge is altered by changes in temperature.

Another important object of this invention is to provide a meter having a plurality of ranges thereby insuring greater accuracy in readings over wide variations of flux densities.

Other and more specific objects will be apparent from the following description taken in connection with the accompanying drawings, wherein Figure 1 is a schematic circuit diagram of the entire instrument.

Figure 2 is a sample calibration chart for the flux meter.

Figure 3:
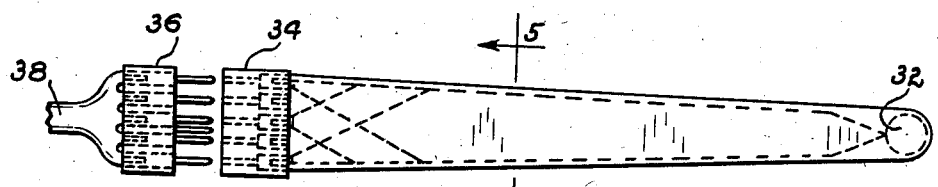
Figure 3 shows the bridge or exploring probe and the terminal block assembly.

Referring to the drawings, throughout which like reference characters indicate like parts, Figure 1 is the schematic circuit diagram of the magnetic flux meter. The Wheatstone bridge portion of the circuit is composed of the four resistances shown at 2, 4, 6, 8, and a fifth resistor, which is adjustable, shown at 10. The two diametrically opposite resistors shown at 2 and 6 are the bismuth spirals, the electrical resistance of which is a function of the magnetic flux passing through them. The other two arms indicated at 4 are resistances which are practically non-sensitive to the magnetic field.

To balance out any alternating voltage still generated in the bridge coils, an alternating current compensating coil of a few turns of copper wire is shown at 16 and connected across potentiometer 12.

The battery 24 supplies current to the bridge and said current is controlled by resistance 18 and measured by milliammeter 20. Meter 22 indicates the unbalanced current across the bridge and since this current is a function of the magnetic flux being measured it may be calibrated to read the magnetic flux intensity.

Thermocouple 26 is built into the bridge and its terminals are brought out at 28 for connecting to a galvanometer. By such means, the exact temperature of the bridge element may be determined and any correction necessary may be applied to the readings of meter 22. The terminals at 30 are for connecting to an oscillograph when transient fields are to be measured.

The calibration graph of Figure 2 shows three families of characteristic curves for this bridge. All curves were taken at a constant temperature. The full line indicates the calibration for direct current flux, while the dashed line indicates the alternating current calibration. The three families of curves A, B, and C, result from three values of currents used in the bridge, namely, three milliamperes in the case of A, 10 milliamperes for B, and 25 milliamperes for C. The dashed curve indicates average values of alternating current flux.

Figure 3 shows in more detail the arrangement of all elements of the bridge shown externally to the dashed enclosure in Figure 1. The sensitive portion of the exploring probe is shown at 32 and contains the four arms of the bridge plus the compensating coil and the thermocouple element. These are connected by suitable foil leads to the jack shown at 34. The plug 36 connects the exploring probe to the other meter elements through a suitable cable 38.

Figure 4:
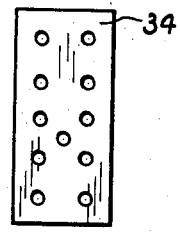
Figure 4 shows an end view of the jack.

Figure 4 shows the details of the jack 36.

Figure 5:
Figure 5 shows an enlarged section through line 5—5 of Figure 3.

Figure 5 shows an enlarged cross-section along line 5—5 of Figure 3. The leads from the alternating current compensating coil is shown at 17. The mica support and cover strips are indicated at 42, while the copper foil lead strips are shown at 44. The lead strips are separated by sheets of paper at 46.

Figure 6:
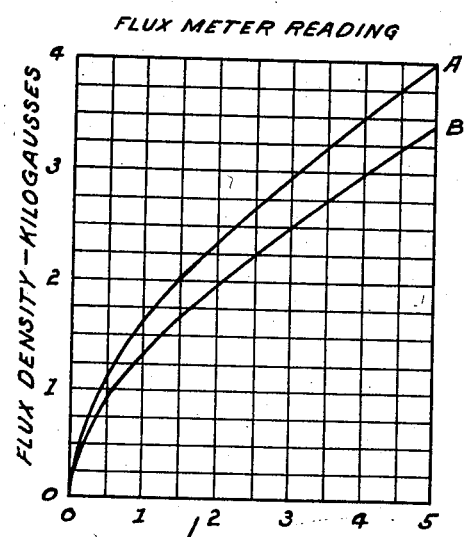
Figure 6 is a graph showing the directional effect of the magnetic flux when passing through the exploring coils.

Curves A and B in Figure 6 show respectively the effect of the magnetic flux being parallel to the plane of the exploring coils and perpendicular to the plane of the same coils.

Basically, the operation of this magnetic flux meter depends upon the change in the electrical resistance bismuth exhibits when placed in a magnetic field. In addition to the usual elements found in a Wheatstone bridge, several novel refinements have been incorporated in this instrument to eliminate certain undesirable errors. Two bismuth resistors as shown at 2 and 8 in Figure 1 are placed in the diametrically opposite arms of a Wheatstone bridge, and in zero magnetic field, the bridge is accurately balanced by using an ordinary adjustable resistance in one or more of the remaining arms such as shown at 10 in Figure 1. When placed in a magnetic field, the bridge is unbalanced by an amount depending upon the effect of that field upon the bismuth resistance. Thus the current, or voltage due to this unbalance can be calibrated directly in terms of the magnetic field density. This unbalanced current, or voltage, is indicated by meter 22 in Figure 1. The meter used in the particular instrument was a model 600 Weston, 0–500 microammeter, with a resistance of 10 ohms.

To avoid changes in the zero setting of the meter 22, due to temperature variation, all the resistors in the bridge are adjusted to have the same temperature resistance change. To accomplish this, a metal of higher temperature coefficient of resistance than bismuth was used, and only enough so that its resistance change would always be equal to the corresponding resistance change of the bismuth. The remainder of the balancing resistance for each arm may be made of manganin resistance or some similar material. In this way the zero shift could actually be made equal to zero for the usual working temperature, or for any temperature range over which the temperature coefficient of the metals remains a constant.

The equation used to determine the value of such balancing resistances is as follows:

$$R_0 = R_b a_b / a_0$$

Where $R_0$ = resistance of the balancing resistor at the assumed base temperature $R_d$ = resistance of the bismuth resistor at the assumed base temperature $a_0$ = temperature coefficient of the balancing resistor material at the base temperature $a_b$ = temperature coefficient of bismuth at the base temperature In some of the first bridges built, nickel wire was used for the resistance arms 4 and 6 in Figure 1. However, it was found that under certain conditions which will be discussed later a slight negative reading was obtained. This disadvantage was eliminated by the substitution of either lead or tin wire for the resistance arms 4 and 6 in Figure 1.

Figure 7:

All four of the resistance arms 2, 4, 6, and 8 in Figure 1 are wound in flat non-inductive spirals as shown in Figure 7. The bismuth spirals 2 and 8 were placed between the other resistance spirals 4 and 6. A very sudden change in temperature may result in uneven heating of the various spirals, and thus a temporary shift of the zero. This could be greatly reduced by interwinding the turns of bismuth and its balancing spiral.

The bismuth spirals and their balancing spirals are assembled in the end of an exploring probe as shown at 32 in Figure 3. The main body of this exploring probe is made up of a central supporting strip of any suitable insulating material, copper foil conducting strips, separated by a thin layer of insulation, and finally a probe protective strip on the outside. The exploring probe is thus built up on each side from the central supporting strip. The bridge design shown in Figure 3 and described above was necessary to avoid undesirable thermo-electric effects and also to balance out any induced voltage in the foil leads when used in alternating current, or transient fields. Since bismuth has a rather high thermo-electric effect when joined to the majority of metals, a considerable amount of error might result if the junction of the various ends of the spirals were not kept at the same temperature. The copper foil and insulating strip construction accomplishes this purpose very satisfactorily. All junctions were made as near each other as possible so that very little difference in their temperatures could exist. Furthermore, the thinness of the exploring probe shown in Figure 3 allows it to be used in probing into very narrow magnetic air gaps.

A third problem presents itself when the temperature of the bridge varies any considerable amount from that at which the bridge is calibrated. When a considerable difference in temperature is involved some correction must be made to compensate for the change of sensitivity, if any great accuracy is desired. When in a constant magnetic field bismuth has the characteristic of an increasing change of resistance as the temperature decreases, in order to determine the variation in the bridge temperature, a small thermo-couple may be built into the bridge with one junction placed between turns, as far into the bismuth spiral as possible. The other junction may be placed in the meter case where a thermometer could be in contact with it. The thermocouple may then be calibrated for the difference in temperature between these junctions. Such a thermocouple is shown at 26, its cold junction at 27, and terminals for the galvanometer at 28, in the schematic diagram of Figure 1. Although the galvanometer for the thermocouple 26 is indicated as being connected externally to the case of the flux meter, it could just as well be included as an integral part of the meter.

Instead of taking corrections from a chart or graph or by means of a correction formula, some automatic or manually operated device might be devised to alter the sensitivity of meter 22, or the resistance of some other portion of the circuit, or introduce some compensating voltage to correct the error in the proper sense.

For certain types of work where space is available for enclosing the probe in a special temperature controlling compartment, the probe may be maintained at some desired constant temperature for obtaining accuracy in readings or for operating the bridge at some more optimum temperature or both.

It has been found impractical to design the bridge spirals to be absolutely non-inductive. Even with great care there may still be some unbalanced alternating voltage induced in one or more arms of the bridge. It is therefore much more simple to balance out any alternating voltage generated in the bridge coils by means of an alternating voltage compensating coil of a few turns of copper wire wound around the outside of one set of the bridge coils. Such an alternating compensating coil is shown at 16 in Figure 1. The alternating voltage developed by this coil when in an alternating field is applied across the potentiometer 12, one side of which is connected to the center terminal of the single pole double throw switch 31. By means of the sliding contact 13 on potentiometer 12, the required amount of voltage may be selected to cancel out that which is induced in the spirals of the bridge. It is of course necessary that the instantaneous polarity across potentiometer 12 have such a relationship as to oppose the voltage induced in the bridge itself. To make the adjustment of cancelling any induced alternating voltage an oscillograph may be connected to the terminals shown at 30 in Figure 1. Switch 31 is thrown in the proper position to connect the oscillograph in the circuit. The exploring coils are then placed in a strong alternating magnetic field and the meter battery circuit is left open. The sliding contact 13 on potentiometer 12 is then adjusted for zero response in the oscillograph connected to the terminals 30. After this adjustment is once made no further alteration is necessary. When the instrument is used for direct current, this coil has no function and is virtually outside the working circuit.

The method of construction shown in Figure 3, wherein the exploring probe elements are connected to the meter box by means of a jack, plug, and cable was resorted to in order that several exploring probes of different characteristics could be used with the same meter box and its component instruments. This method allows the bridge coils to be easily detached for checking or repairs but is of most value in making adjustment during construction. For example, if the meter is supplied with more than one bridge, the elements of one may be very small in diameter for measuring fields of very small area, while another may be designed with a very much larger area, but sensitive to much lower field densities. In this way, the utility of the meter as a whole is very greatly enhanced.

The alternating current calibration curves shown in dashed line in Figure 2 were obtained from tests for frequencies varying from 12 to 540 cycles per second. Below 12 cycles, the instrument pointers vibrated too much for a reading. No apparatus was available to go above 540 cycles, and theoretically this magnetic flux meter should give satisfactory results for frequencies several times the limits set by the apparatus. All values taken over this range of frequencies were seldom over two per cent. above or below the average value shown in the dashed line of Figure 2. There seems to be no tendency whatever for the values taken at higher frequencies to be either higher or lower than the other.

In addition to metering direct current flux, alternating current flux, and transient flux, this meter will also indicate the direction of the magnetic flux vector being measured. In Figure 6 is shown a calibration curve wherein curve A shows meter readings when the magnetic flux is parallel to the plane of the coils or spirals of the exploring probe. Curve B was obtained by having the magnetic flux perpendicular to the plane of the coils or spirals in the exploring probe. It is therefore obvious that to find the position of the magnetic flux vector it is only necessary to change the position of the exploring coils in the magnetic field until a maximum reading is obtained on the meter, in which position the magnetic flux vector is perpendicular to the exploring coil plane. It has been found that if nickel wire is used for the balancing spiral a negative reading will be obtained in meter 22 when the exploring coils are placed parallel to the magnetic flux lines, if the flux densities are relatively low. By using lead or tin wire instead of nickel for the balancing spirals, no negative readings are obtained and hence this disadvantage is eliminated.

In the construction of several bridges and exploring probes, it was found that ordinary solders have such high melting points that the bismuth wire would be melted before a joint could be made. By using a forty per cent. lead, sixty per cent. bismuth alloy, and a heat controlled iron for soldering, a very successful soldered joint can be made, since the melting point of this alloy is far below the melting point of the bismuth.

By substituting a transformer for the battery 24 to supply the bridge with alternating current, and by using the proper meters in 20 and 22, the instrument could be operated from an alternating current source instead of a battery without departing from the scope of the basic concept involved herein.

Although bismuth has been specifically mentioned as the electrically resistive magneto sensitive material for the diametrically opposite arms of the Wheatstone bridge, any other material having similar characteristics could, as well, be used in a magnetic flux meter of this type and still come under the scope of this invention.

Likewise, the method of compensating, for the voltage induced in the bridge, by means of the compensating coil is merely one of several methods which could be employed to accomplish the same purpose. Any method of compensating for said induced voltage would be well within the intent of this invention.

Since the sensitivity of the magnetic flux meter changes with a change of temperature, it is obvious that corrections may be made by changing the sensitivity of meter 22 in an opposite sense and the use of such a method of correction or the use of other compensating devices in the form of altering the resistance or by altering the voltage in the proper portion of the circuit would still be within the concept of this invention.

It has also been found to be advantageous to surround the bridge elements with some suitable material for maintaining them at some constant or predetermined temperature, or for operating the bridge at a more optimum temperature.

Although specific materials and specific qualities of such materials have been mentioned for the purpose of maintaining the balance of the Wheatstone bridge in spite of temperature changes, other materials and other qualities of such materials are anticipated for accomplishing the same purpose in this invention.

The foregoing description and the accompanying drawings are believed to clearly disclose a preferred embodiment of my invention, but it will be understood that this disclosure is merely illustrative and that such changes in the invention may be made as are fairly within the scope and spirit of the following claims.

I claim:

1. A magnetic flux meter comprising a Wheatstone bridge having two of its arms composed mainly of bismuth, adjusting means for obtaining an electric balance in the bridge, a source of energy for electrical excitation of said bridge, means for adjusting the flow of energy to the bridge from said source, means for determining the amount of excitation being supplied to said bridge, means for indicating the unbalance energy in the bridge, and a compensating coil absorbing energy from the magnetic field under measurement and applying a portion to oppose any unbalanced energy induced in the bridge by the magnetic field being measured.

2. A magnetic flux meter comprising a four-arm resistance bridge having two diametrically opposite arms composed mainly of bismuth, one arm of said bridge including an adjustable resistance member, a source of electric energy connected serially through resistive means and a metering device to said bridge, a compensating coil disposed in such a manner as to be inductively linked by the magnetic flux under measurement, a metering circuit comprising a current indicating device connected serially through a resistance and said compensating coil in parallel, and said metering circuit connected to the nominally neutral points on the bridge.

3. A magnetic flux meter comprising a four-arm resistance bridge having two diametrically opposite arms composed mainly of bismuth, one arm of said bridge including an adjustable resistance member, a source of electric energy connected serially through resistive means and a metering device to said bridge, a compensating coil disposed in such a manner as to be inductively linked by the magnetic flux under measurement, a metering circuit comprising a current indicating device connected serially through a resistance and said compensating coil in parallel, said metering circuit connected to the nominally electrically neutral points of the bridge, and adjacent to the said bridge arms thermo-electric means conductively connected to a current indicating device.

4. A magnetic flux measuring device comprising a four-arm resistance bridge, two diametrically opposite arms of said bridge containing electrically-resistive-magneto-sensitive elements, one arm of said bridge including an adjustably resistive element, a source of electric energy conductively coupled serially through a metering device and adjustably resistive means to electrically and diametrically opposite points on the bridge, a metering circuit comprising a metering device conductively coupled serially through adjustably resistive means to the neutral points of said bridge and a compensating coil disposed in the immediate region of the electrically-resistive-magneto-sensitive elements of the aforementioned bridge and conductively coupled in parallel with the adjustably resistive means included in the aforementioned metering circuit.

GEORGE S. SMITH.